United States Patent Office 2,964,584
Patented Dec. 13, 1960

2,964,584

INTER-ELECTRODE SEPARATORS AND PROCESS FOR MAKING SAME

Meyer Mendelsohn, New York, and Frank Solomon, Lake Success, N.Y., assignors, by mesne assignments, to Yardney International Corp., New York, N.Y., a corporation of New York No Drawing. Filed July 29, 1957, Ser. No. 674,551

10 Claims. (Cl. 136—146)

Our present invention relates to inter-electrode separators, particularly (but not exclusively) for alkaline batteries of the rechargeable silver-zinc type, and to a process for making same.

The invention has for its principal object the provision of a group of novel and improved separators for such batteries adapted substantially to prevent the short-circuiting of closely spaced electrodes while enabling a virtually unhindered passage of electrolyte. This application is a continuation-in-part of application Ser. No. 285,786, filed May 2, 1952, and now abandoned.

In accordance with the present invention there is provided a separator comprising a semi-permeable film having ion-exchange properties, obtained by the sulfonation of a protein, which is coated upon an electrolyte-permeable support such as, for example, a sheet of regenerated cellulose.

The usefulness of ion exchangers in combination with interelectrode separators has been disclosed in co-pending application Ser. No. 251,780, filed October 17, 1951, by Meyer Mendelsohn, one of the present applicants, now Patent No. 2,816,154, issued December 10, 1957. Said application discloses, however, the use of separator sheets coated with films incorporating commercially available, non-film-forming ion exchangers, this class of materials being excluded from the group claimed as our present invention.

The value of an ion exchanger in an inter-electrode separator, serving to prevent contact between the active materials of opposite polarities while permitting the passage of electrolyte, is believed to be at least twofold: ($a$) by capturing metal ions it prevents migrating particles of active electrode material from penetrating the semi-permeable membrane and thereby short-circuiting the battery; ($b$) by transferring the charge of metal or metal-salt ions to other, non-metallic ions of greater mobility it reduces the apparent inner resistance of the cell. A third effect may reside in ($c$) a modification of the chemical structure of the film-forming material incorporating the ion exchanger in a manner enhancing the electrolytical permeability of the film, thereby further reducing the apparent internal resistance of the battery.

The process according to the invention involves the sulfonation of a protein, of animal or plant origin, of which casein, zein, soy-bean protein, keratin and gelatin are representative examples. The sulfonation product, upon being precipitated in an alkaline medium, is redissolved in a weak acidic solution to form a film suitable for the coating of a preferably sheet-like carrier or greater or less electrolytic permeability.

Example I

Lactic casein is dissolved in concentrated (e.g. 96%) sulfuric acid and thereafter stored, at room temperature for four days, until dissolution is complete. The resultant product is further dissolved in water and then precipitated with potassium hydroxide, yielding a white powder soluble in weak acids. This powder is next dissolved in a weak solution of acid character, e.g. sulfuric acid of low concentration, thereby producing a film-forming substance adapted to coat a suitable carrier (e.g. a sheet of regenerated cellulose, a layer of polyvinyl alcohol or a nylon fabric) dipped into it.

Example II

A plant protein, such as zein or soy-bean protein, is substituted for the animal protein (casein) of Example I, the process being otherwise the same.

Example III

A high-molecular-weight protein, such as keratin, or a low-molecular-weight protein, such as gelatin, is sulfonated and further treated in the manner described in Example I for a protein (casein) of medium weight.

In each of the foregoing processes the protein may be treated at elevated temperature, e.g. up to 80° C., instead of at room temperature; this reduces the time necessary for the completion of the sulfonation step. This time may be further reduced by carrying out the sulfonation in the presence of silver oxide as a catalyst, e.g. in the manner taught in U.S. application Ser. No. 349,091, filed April 15, 1953, by Meyer Mendelsohn, one of the present applicants, now Patent No. 2,838,482, issued June 10, 1958; reference is made to this patent for a more specific description of a typical sulfonation process.

It will be seen from the foregoing examples that the invention can be practiced with all kinds of proteins and that the resulting film may be applied to various electrolyte-permeable, alkali-resistant carriers to produce a satisfactory inter-electrode battery separator. It has been found that such separators will, as a class, withstand deterioration for a large number of charge-discharge cycles and will be superior, in their ability to prevent internal short circuits, to conventional separators of comparable mechanical strength and electrolytic permeability. The ion-exchanger film of sulfonated protein will also protect the underlying carrier against oxidation and other chemical attack to which it might otherwise be susceptible. As a result, a wide variety of cellulosic, thermoplastic and other materials in the form of semi-permeable membranes, porous or perforated sheets, woven fabrics, etc. may be used as a support for the film.

We claim:

1. A process for making an inter-electrode separator for electric batteries, comprising the steps of dissolving a protein in sulfuric acid to obtain a sulfonated-protein solution, precipitating the sulfonated protein from the solution by addition of an alkali to obtain a powder precipitate, dissolving the powder in a low concentration of an acid to produce a film-forming substance and coating same on an electrolyte-permeable carrier.

2. The process according to claim 1, wherein said alkali is potassium hydroxide and the last-mentioned acid is sulfuric acid.

3. The process according to claim 1, wherein said protein is selected from the group which consists of casein, zein, soy-bean protein, keratin and gelatin.

4. A process for making an inter-electrode separator for electric batteries, comprising the steps of dissolving a protein in sulfuric acid to obtain a sulfonated-protein solution, precipitating the sulfonated protein from the solution by addition of an alkali to obtain a powder precipitate, dissolving the powder in a low concentration of an acid to produce a film-forming substance and coating same on an alkali-resistant semi-permeable sheet.

5. The process according to claim 4, wherein said sheet consists of regenerated cellulose.

6. An inter-electrode separator for electric batteries comprising an electrolyte-permeable carrier coated with a film containing a sulfonated protein.

7. An inter-electrode separator for electric batteries, comprising an electrolyte-permeable membrane coated with a film containing a sulfonated protein selected from the group which consists of casein, zein, soy-bean protein, keratin and gelatin.

8. An inter-electrode separator for electric batteries, comprising a semi-permeable membrane coated with a film consisting of a sulfonated protein.

9. An inter-electrode separator according to claim 8, wherein said protein is selected from the group which consists of casein, zein, soy-bean protein, keratin and gelatin.

10. An inter-electrode separator according to claim 8, wherein said membrane is a sheet of regenerated cellulose.

References Cited in the file of this patent

UNITED STATES PATENTS

| | | |
|---|---|---|
| 1,981,352 | Fruth | Nov. 20, 1934 |
| 2,228,158 | Teale | Jan. 7, 1941 |
| 2,516,700 | Holloway | July 25, 1950 |
| 2,637,675 | Bain | May 5, 1953 |
| 2,703,290 | Scott et al. | Mar. 1, 1955 |

FOREIGN PATENTS

| | | |
|---|---|---|
| 371,478 | Great Britain | Apr. 28, 1932 |